US012699624B2

(12) United States Patent
Shin et al.

(10) Patent No.: US 12,699,624 B2
(45) Date of Patent: Aug. 4, 2026

(54) METHOD AND APPARATUS FOR APPLYING ECC TO MEMORY IN ARTIFICIAL NEURAL NETWORK BASED SYSTEM SEMICONDUCTOR

(71) Applicant: TELECHIPS INC., Seongnam-si (KR)

(72) Inventors: I Jou Shin, Seongnam-si (KR); Dong Joo Kim, Seongnam-si (KR); Moon Soo Kim, Seongnam-si (KR)

(73) Assignee: TELECHIPS INC., Seongnam-si (KR)

( * ) Notice: Subject to any disclaimer, the term of this patent is extended or adjusted under 35 U.S.C. 154(b) by 64 days.

(21) Appl. No.: 18/793,399

(22) Filed: Aug. 2, 2024

(65) Prior Publication Data

US 2025/0068511 A1 Feb. 27, 2025

(30) Foreign Application Priority Data

Aug. 24, 2023 (KR) ........................ 10-2023-0111389

(51) Int. Cl.
*G06F 11/10* (2006.01)
(52) U.S. Cl.
CPC .................................... *G06F 11/10* (2013.01)

(58) Field of Classification Search
CPC ...... G06F 11/10; G06F 11/1048; G11C 29/42; G11C 29/1201; G06N 3/02
See application file for complete search history.

(56) References Cited

U.S. PATENT DOCUMENTS

| 7,461,320 | B2 * | 12/2008 | Klein | ................... G06F 11/1052 |
| | | | | 714/E11.05 |
| 2008/0092016 | A1 * | 4/2008 | Pawlowski | ......... G06F 11/1076 |
| | | | | 714/E11.041 |
| 2012/0311402 | A1 | 12/2012 | Tseng et al. | |
| 2022/0013189 | A1 | 1/2022 | Berman et al. | |

* cited by examiner

*Primary Examiner* — Esaw T Abraham
*Assistant Examiner* — Kareem Fuad Alhwamdeh

(57) ABSTRACT

A method for applying error correction code (ECC) to a memory performed by an apparatus for applying ECC to a memory in an artificial neural network-based system semiconductor, includes dividing memory cells into a plurality of groups of memory cell arrays corresponding to first to n-th frames based on word lines, wherein n is a natural number greater than or equal to 2, performing an ECC write or read operation by applying ECC to a memory cell array of a group corresponding to each of the first to n-th frames, and performing a general write or read operation without applying ECC to the memory cell array of the remaining groups excluding the group corresponding to each of the first to n-th frames.

12 Claims, 14 Drawing Sheets

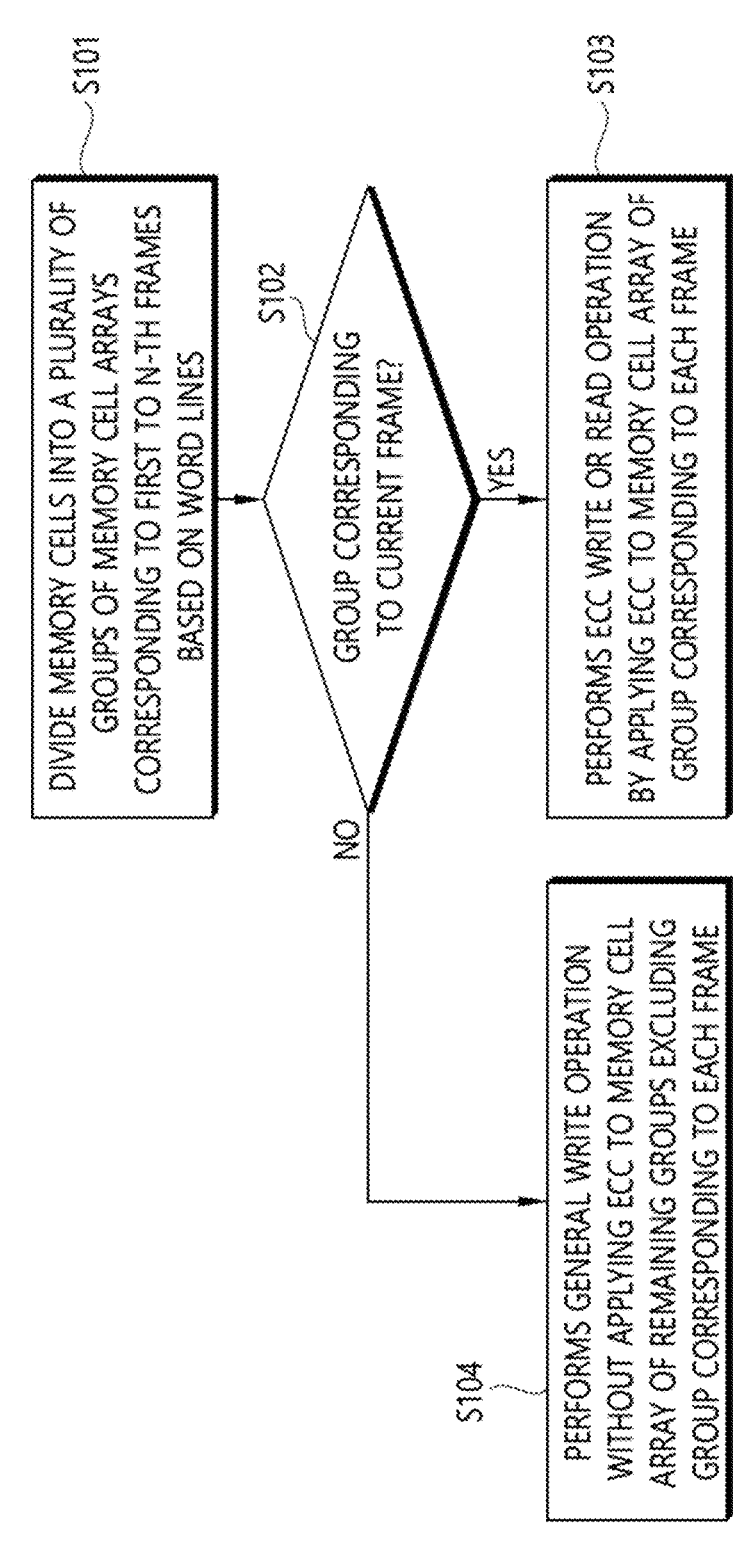

S101

DIVIDE MEMORY CELLS INTO A PLURALITY OF GROUPS OF MEMORY CELL ARRAYS CORRESPONDING TO FIRST TO N-TH FRAMES BASED ON WORD LINES

S102

GROUP CORRESPONDING TO CURRENT FRAME?

S103

YES

PERFORMS ECC WRITE OR READ OPERATION BY APPLYING ECC TO MEMORY CELL ARRAY OF GROUP CORRESPONDING TO EACH FRAME

NO

S104

PERFORMS GENERAL WRITE OPERATION WITHOUT APPLYING ECC TO MEMORY CELL ARRAY OF REMAINING GROUPS EXCLUDING GROUP CORRESPONDING TO EACH FRAME

FIG. 5

| A | B | C | D0 | D1 | D2 | D3 | D4 | D5 | D6 | D7 |
|---|---|---|----|----|----|----|----|----|----|----|
| 0 | 0 | 0 | 1 | 0 | 0 | 0 | 0 | 0 | 0 | 0 |
| 0 | 0 | 1 | 0 | 1 | 0 | 0 | 0 | 0 | 0 | 0 |
| 0 | 1 | 0 | 0 | 0 | 1 | 0 | 0 | 0 | 0 | 0 |
| 0 | 1 | 1 | 0 | 0 | 0 | 1 | 0 | 0 | 0 | 0 |
| 1 | 0 | 0 | 0 | 0 | 0 | 0 | 1 | 0 | 0 | 0 |
| 1 | 0 | 1 | 0 | 0 | 0 | 0 | 0 | 1 | 0 | 0 |
| 1 | 1 | 0 | 0 | 0 | 0 | 0 | 0 | 0 | 1 | 0 |
| 1 | 1 | 1 | 0 | 0 | 0 | 0 | 0 | 0 | 0 | 1 |

FIG. 7B

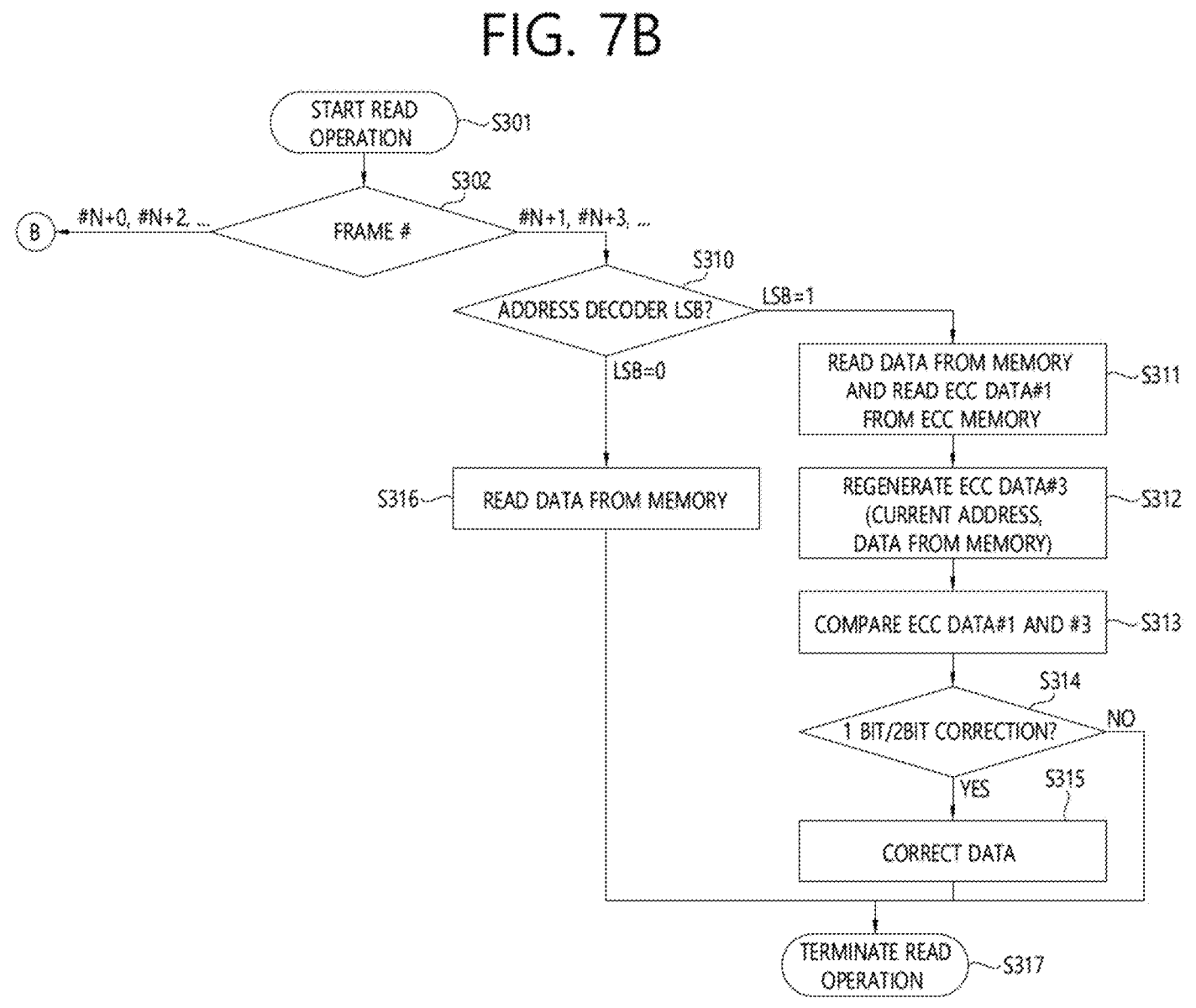

START READ OPERATION — S301

S302

FRAME #

N+0, #N+2, ...
→ B

N+1, #N+3, ...

S310 — ADDRESS DECODER LSB?

LSB=1

LSB=0

READ DATA FROM MEMORY AND READ ECC DATA#1 FROM ECC MEMORY — S311

REGENERATE ECC DATA#3 (CURRENT ADDRESS, DATA FROM MEMORY) — S312

COMPARE ECC DATA#1 AND #3 — S313

S314 — 1 BIT/2BIT CORRECTION?

NO

YES

CORRECT DATA — S315

READ DATA FROM MEMORY — S316

TERMINATE READ OPERATION — S317

METHOD AND APPARATUS FOR APPLYING ECC TO MEMORY IN ARTIFICIAL NEURAL NETWORK BASED SYSTEM SEMICONDUCTOR

CROSS REFERENCE TO RELATED APPLICATION

This application claims benefit of priority under 35 U.S.C. § 119 (a) to Korean Patent Application No. 10-2023-0111389 filed on 24 Aug. 2023 in the Korean Intellectual Property Office, the disclosure of which is herein incorporated by reference in its entirety.

TECHNICAL FIELD

The present disclosure relates to an object recognition system used in an artificial neural network-based system semiconductor, and more particularly, to a method and apparatus for applying error correction code (ECC) to a memory in an artificial neural network-based system semiconductor.

BACKGROUND

A general method to reduce a memory failure rate used in artificial neural network-based system semiconductors is to use ECC in a memory.

ECC is a method for using check bits when storing data in a memory. ECC code representing the bit order per data unit is calculated and stored with the data. When reading a data unit, the ECC code is regenerated using the read data, and then the regenerated ECC code is compared with the read ECC code to determine whether there is an error in the data.

In related art ECC application technology, when ECC is used, an additional memory region is allocated to check whether there are errors in data. Therefore, there is a disadvantage in that the ECC memory region increases. When ECC is used using a single error detection double error detection (SEC-DEC) method, the check bits generated depending on the data unit are 6 bits per 16 bits, 7 bits per 32 bits, 8 bits per 64 bits, and 9 bits per 128 bits. The memory regions due to the addition of check bits are 38%, 22%, 13%, and 7% for 16 bits, 32 bits, 64 bits, and 128 bits, respectively.

Meanwhile, in the related art, in order to alleviate the effects of failure of adjacent memory cells, a method in which a first ECC circuit receives information from even-numbered memory cells and a second ECC circuit receives information from odd-numbered memory cells may be used. In this case, although the effects of failure may be alleviated as the first and second ECC circuits use non-adjacent memory cells, the memory region may be inevitably increased due to the added ECC circuits.

SUMMARY

Exemplary embodiments of the present disclosure provides a method and apparatus for applying error correction code (ECC) to a memory in an artificial neural network-based system semiconductor for efficient ECC application in consideration of diagnostic coverage and area in the artificial neural network-based system semiconductor.

However, the problem to be solved by the present disclosure is not limited thereto and may be expanded variously in an environment without departing from the spirit and scope of the present disclosure.

According to one example embodiment of the present disclosure, it is provided a method for applying an error correction code (ECC) to a memory in an artificial neural network-based system semiconductor, the method including: dividing memory cells into a plurality of groups of memory cell arrays corresponding to first to n-th frames based on word lines, wherein n is a natural number greater than or equal to 2; performing an ECC write or read operation by applying the ECC to a memory cell array of a group corresponding to each of the first to n-th frames; and performing a general write or read operation without applying the ECC to the memory cell array of the remaining groups excluding the group corresponding to each of the first to n-th frames.

A number of the ECC write or read operation by applying ECC and the general write or read operation is adjusted according to fault handing time interval (FTTI) time and a frame processing time.

In the ECC write operation, the ECC is generated by an ECC encoder based on write data in the memory cell array of the group corresponding to each frame selected by an address decoder based on the word lines, and the write data is stored in the memory and the generated ECC is stored in an ECC memory.

In the ECC read operation, the ECC is regenerated from the memory cell array of the group corresponding to each frame selected by an address decoder based on the word lines, and the regenerated ECC is compared with the ECC read from an ECC memory.

In the performing of the ECC write or read operation, the ECC is applied to the memory cell array of the group corresponding to each frame selected based on a least significant bit (LSB) of address decoder input information.

In the performing of the general write or read operation, a write or read operation is performed by adding a parity bit for error detection to the memory cell array of the remaining groups excluding the group corresponding to each of the first to n-th frames.

In the performing of the general write or read operation, an error is detected by calculating the number of bits by combining the read data and the parity bit of a selected word line based on an LSB of address decoder input information in the memory cell array of the remaining groups excluding the group corresponding to each frame.

According to one example embodiment of the present disclosure, it is provided an apparatus for applying an error correction code (ECC) to a memory in an artificial neural network-based system semiconductor, the apparatus including: a memory cell configured to store data generated by the artificial neural network-based system semiconductor; an ECC memory configured to store the ECC related to an ECC write or read operation; a storage module configured to store one or more programs; and a processor configured to execute the one or more stored programs, wherein the processor is configured to: divide memory cells into a plurality of groups of memory cell arrays corresponding to first to n-th frames based on word lines, wherein n is a natural number greater than or equal to 2, perform the ECC write or read operation by applying the ECC to a memory cell array of a group corresponding to each of the first to n-th frames, and perform a general write or read operation without applying the ECC to the memory cell array of the remaining groups excluding the group corresponding to each of the first to n-th frames.

A number of ECC applications applicable to the ECC write or read operation and the general write or read operation is adjusted according to fault handing time interval (FTTI) time and frame processing time.

In the ECC write operation, the ECC is generated by an ECC encoder based on write data in the memory cell array of the group corresponding to each frame selected by an address decoder based on the word lines, and the write data is stored in the memory and the generated ECC is stored in the ECC memory.

In the ECC read operation, the ECC is regenerated from the memory cell array of the group corresponding to each frame selected by an address decoder based on the word lines, and the regenerated ECC is compared with the ECC read from the ECC memory.

The processor may apply the ECC to the memory cell array of the group corresponding to each frame selected based on a least significant bit (LSB) of address decoder input information.

The processor may perform a write or read operation by adding a parity bit for error detection to the memory cell array of the remaining groups excluding the group corresponding to each of the first to n-th frames.

The processor may detect an error by calculating the number of bits by combining the read data and the parity bit of a selected word line based on an LSB of address decoder input information in the memory cell array of the remaining groups excluding the group corresponding to each frame.

The disclosed technology may have the following effects. However, since it does not mean that a specific embodiment should include all of the following effects or only the following effects, the scope of the disclosed technology should not be understood as being limited thereby.

In the embodiments of the present disclosure, efficient ECC may be applied in consideration of diagnostic coverage and area in artificial neural network-based system semiconductors.

In the embodiments of the present disclosure, ECC may be selectively applied to a memory cell array of a group corresponding to a frame, thereby reducing additional ECC memory region generated when using ECC.

In the embodiments of the present disclosure, the additional memory region generated when using ECC may be reduced by considering a memory usage method used in artificial neural network-based system semiconductors.

In the embodiments of the present disclosure, the memory region may be further reduced by maximizing the application of ECC to the memory cells, considering the frame processing time interval of an artificial neural network, which can be processed within the vehicle-level fault handling time interval (FTTI).

a reduced memory region may be further reduced by applying ECC to a memory cell as much as possible in consideration of a frame processing time interval of an artificial neural network that may be processed within a vehicle-level fault handing time interval (FTTI).

In the embodiments of the present disclosure, a memory reduction effect may be achieved by adjusting the number of ECC applications according to FTTI time and frame processing time.

In the embodiments of the present disclosure, ECC encoding is selectively performed for each frame in a write operation in a memory cell array to reduce an ECC decoding operation that occurs in a read operation by half, thereby reducing memory latency.

BRIEF DESCRIPTION OF THE DRAWINGS

FIG. 2 is a flowchart of a method for applying error correction code (ECC) to memory in an artificial neural network-based system semiconductor according to an embodiment of the present disclosure.

FIG. 5 is a diagram illustrating a truth table of an address decoder used in an embodiment of the present disclosure.

FIGS. 6A, 6B, 7A and 7B are diagrams illustrating selective ECC write and read operations in a method for applying ECC to a memory according to an embodiment of the present disclosure.

FIGS. 8A, 8B, 9A and 9B are diagrams illustrating selective ECC write and read operations using parity bits in a method for applying ECC to a memory according to an embodiment of the present disclosure.

DESCRIPTION OF EMBODIMENTS

Figure 1:
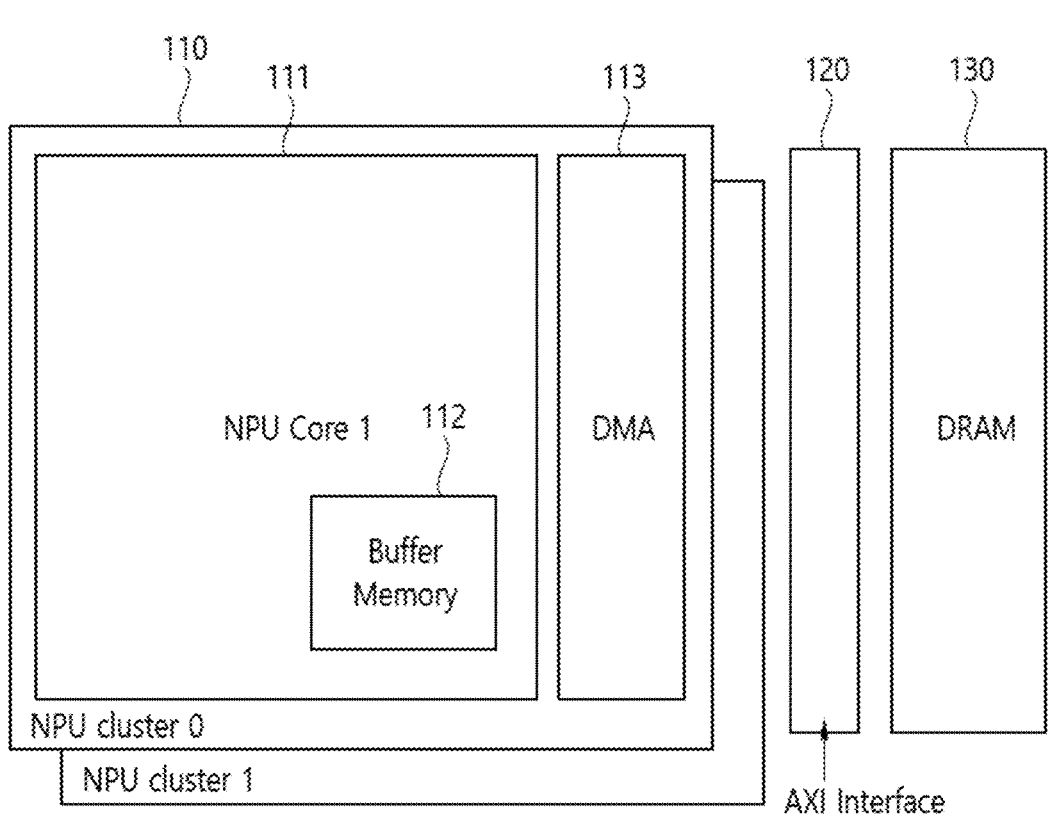
FIG. 1 is a diagram illustrating a configuration of an artificial neural network-based system semiconductor according to an embodiment of the present disclosure.

As the inventive concept allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the scope of the inventive concept are encompassed in the inventive concept. Descriptions of well-known functions and structures incorporated herein may be omitted to avoid obscuring the subject matter of the present disclosure.

In the present disclosure, terms including an ordinal number, such as 'first', 'second', etc. may be used to describe various components, but the components are not to be construed as being limited to the terms. The terms are only used to differentiate one component from other components.

The terms used in the example embodiments of the present disclosure are general terms which are widely used now and selected considering the functions of the present disclosure. However, the terms may vary depending on the intention of a person skilled in the art, a precedent, or the advent of new technology. In addition, in a specified case, the term may be arbitrarily selected. In this case, the meaning of the term will be explained in the corresponding description. Therefore, terms used in the present disclosure may be defined based on a meaning of the terms and contents described in the present disclosure, not simply based on names of the terms.

In the description, the singular forms "a", "an" and "the" are intended to include the plural forms as well, unless the context clearly indicates otherwise. It will be understood that the terms "comprising", "including", "having" and variants thereof specify the presence of stated features, numbers, steps, operations, elements, components, and/or groups thereof, but do not preclude the presence or addition of one or more other features, numbers, steps, operations, elements, components, and/or groups thereof.

Embodiments of the present disclosure will be described below in detail with reference to the accompanying drawings where those components are rendered the same reference number that are the same or are in correspondence, regardless of the figure number, and redundant explanations are omitted.

FIG. 1 is a diagram illustrating a configuration of an artificial neural network-based system semiconductor according to an embodiment of the present disclosure.

First, an apparatus for applying ECC to a memory according to an embodiment of the present disclosure is intended to reduce a memory region generated when check bits are added to use ECC.

As shown in FIG. 1, an artificial neural network-based system semiconductor that recognizes objects in an artificial neural network includes a neural processing unit (NPU) cluster) 110, an advanced extensible interface (AXI) 120, and a memory 130 including DRAM.

The NPU cluster 110 includes an NPU core 111, a buffer memory 112, and a direct memory access (DMA) 113. Data received from a camera is stored in the memory 130. As the data is transferred to the buffer memory 112 in the NPU core 111, the NPU core 111 calculates continuous images, and a result thereof is transferred to the memory 130.

This method processes continuous image data. Since the data is stored in the memory 130, if the data in the memory 130 is damaged, an object recognition rate may be lowered. However, since data is processed continuously, a momentary failure of the memory 130 affects only one frame, but if a permanent memory defect occurs, the object recognition rate continues to decrease.

Therefore, in order to prevent a decrease in the object recognition rate in artificial neural networks. It may be essential to protect an ECC memory. However, to improve object recognition performance, multiprocessing cores are required and memory capacity therefor is also increased, so a chip size continues to increase. Since an ECC memory region for protecting a memory continues to increase, a method to reduce the ECC memory region may also be essential.

To solve the problem, the ECC applying apparatus according to an embodiment of the present disclosure may reduce an additional ECC memory region generated due to the use of ECC by selectively applying ECC to a memory cell array of a group corresponding to a frame.

FIG. 2 is a flowchart of a method for applying ECC to a memory in an artificial neural network-based system semiconductor according to an embodiment of the present disclosure.

In operation S101, the ECC applying apparatus divides memory cells into a plurality groups (first to m-th frames) of memory cell arrays corresponding to first to n-th frames based on word lines. Hereinafter, n and m are natural numbers greater than or equal to 2.

In operation S102, the ECC applying apparatus determines whether a memory cell array is a memory cell array of a group corresponding to a current frame.

In operation S103, if the memory cell array is a memory cell array of a group corresponding to the current frame, the ECC applying apparatus performs an ECC write or read operation by applying ECC to the memory cell array of the group corresponding to each frame.

In operation S104, if the memory cell array is not a memory cell array of the group corresponding to the current frame, the ECC applying apparatus performs a general write operation without applying ECC to the memory cell array of the remaining groups excluding the group corresponding to each frame.

In this manner, the ECC applying apparatus according to an embodiment of the present disclosure uses a method of reducing a memory cell to which ECC is applied by selectively controlling a word line (WL) switching on and off a transistor within a memory cell. The ECC is applied only to a memory cell array (e.g., one specific row) selected in an address decoder and is not applied to an unselected memory cell array. Data failure cannot be detected in an unselected memory cell array, but if the ECC code is applied to the unselected memory cell array in the process of processing the next frame, all memory cell arrays may be detected.

Here, when the ECC applying apparatus according to an embodiment of the present disclosure selectively applies ECC to some memory cell arrays, ECC may be applied to all memory cells within a vehicle-level fault handing time interval (FTTI).

Here, the FTTI indicates the minimum time range from the occurrence of a fault in a vehicle to the occurrence of a possible hazardous event if a vehicle safety mechanism is not activated. The minimum time range should be assessed for all hazardous events. This is because the minimum time range may vary depending on the characteristics of a risk source. The FTTI is related to a risk source that occurs due to a vehicle malfunction and may be used as an attribute related to a safety goal derived from that risk source. Within the relevant FTTI, when the vehicle remains in a safe state, transitions to the safe state, or transitions to an emergency operation, the fault may be handled in a timely manner by the safety mechanism. The occurrence of a hazardous event depends on an existing fault and a scenario in which the fault may affect a vehicle behavior.

Referring to an example of an ECC operation in a memory cell in which the FTTI is considered, when the vehicle-level FTTI is assumed to be 100 ms and an artificial neural network may process 30 frames per second, the interval that may process 1 frame may be 33 ms. Therefore, in the entire memory cell arrays, a total of three selective ECC codes may be applied within FTTI 100 ms. The ECC applying apparatus according to an embodiment of the present disclosure may reduce the ECC memory region to which the ECC code is applied by ⅓ level. Alternatively, if the vehicle-level FTTI is 200 ms and the artificial neural network may process 30 frames per second, ECC codes may be applied up to 6 times within FTTI 200 ms. In this case, the ECC applying apparatus according to an embodiment of the present disclosure may reduce the ECC memory region to which the ECC code is applied to ⅙ level. In this manner, the number of ECC applications that may be applied to an ECC write or read operation and a general write or read operation may be adjusted depending on the FTTI time and frame processing time. Accordingly, an ECC memory reduction effect may be obtained depending on the adjusted number of ECC applications.

Figure 3:
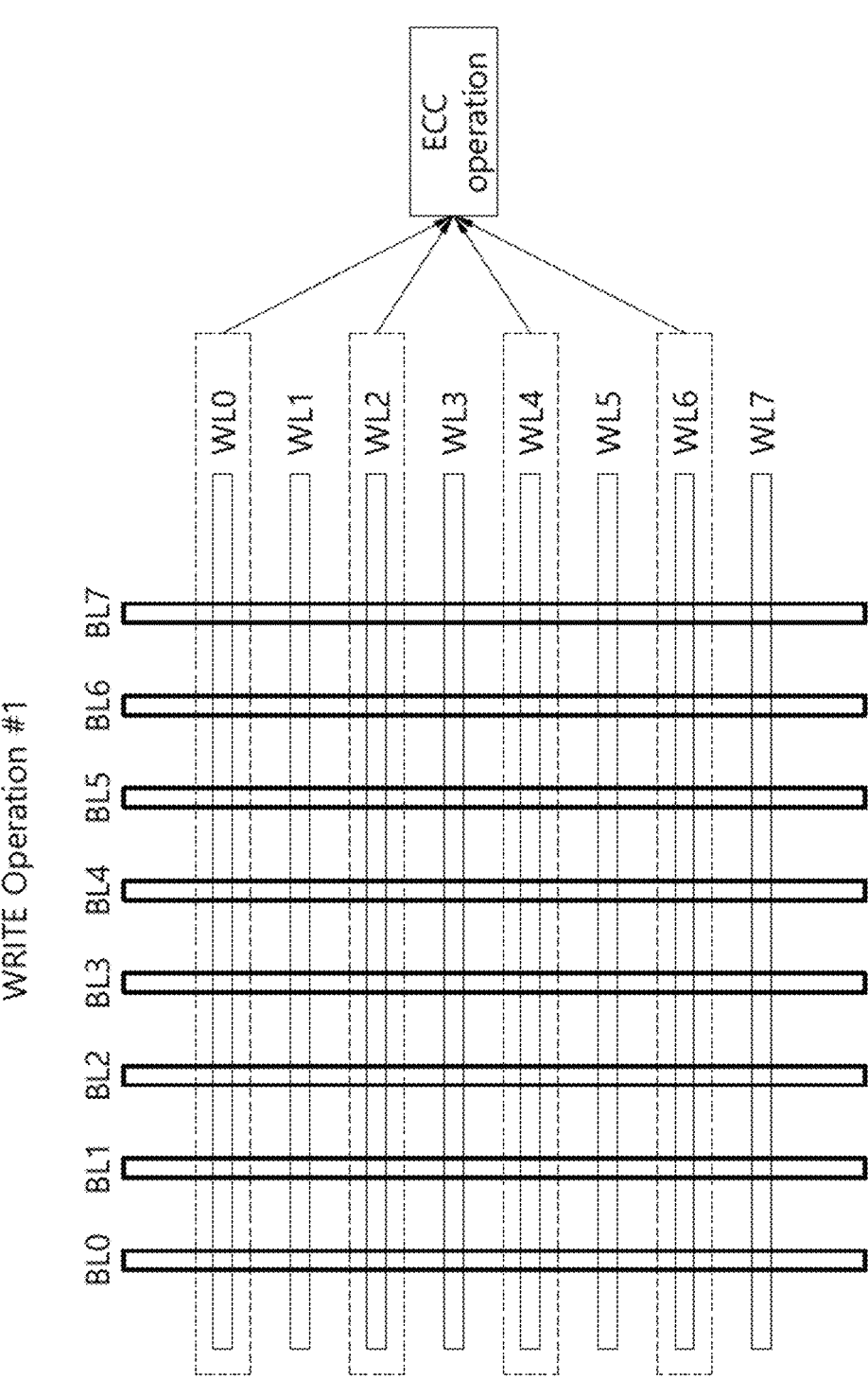
FIGS. 3 and 4 are diagrams illustrating examples of write and read operations using a method for applying ECC to a memory according to an embodiment of the present disclosure.
Figure 4:
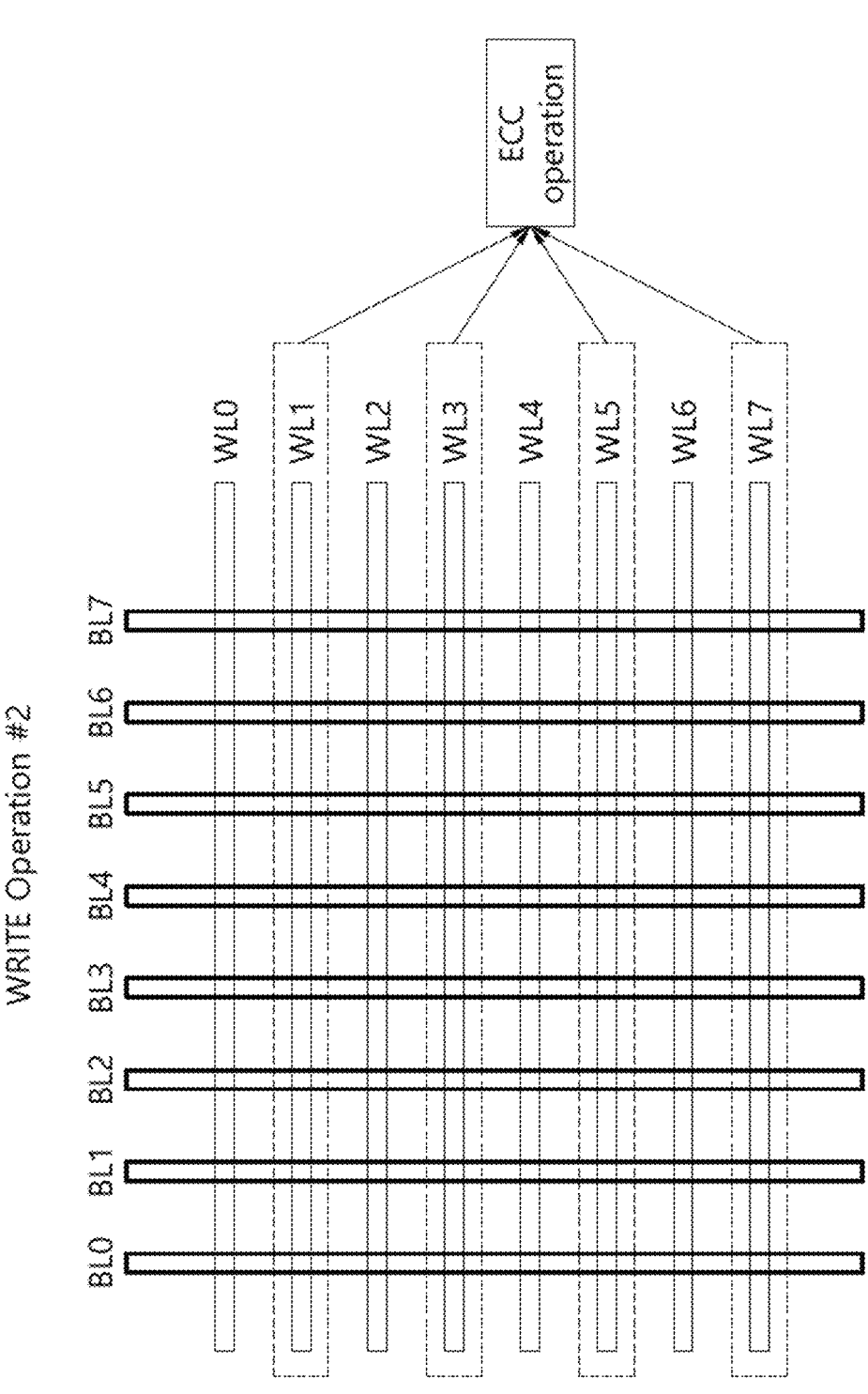

FIGS. 3 and 4 are diagrams illustrating examples of write and read operations using the method for applying ECC to a memory according to an embodiment of the present disclosure.

First, ECC code is generated by an ECC encoder based on write data, the write data is stored in a memory, and the ECC code is stored in an ECC memory.

FIGS. 3 and 4 show an example in which memory cells are alternately divided based on word lines, and ECC operations are selectively applied alternately based on the word lines to perform a write operation and a read operation. For example, the ECC applying apparatus may divide all memory cells into an even-numbered memory cell array and an odd-numbered memory cell array based on word lines. In addition, the ECC applying apparatus may apply the ECC operation to the even-numbered memory cell array in the even-numbered frames and apply the ECC operation to the odd-numbered memory cell array in the odd-numbered frames. Here, the memory cells are not limited to being divided into a specific number. All memory cells may be divided into n groups (n is a natural number of 2 or greater) of memory cell arrays considering vehicle-level FTTI.

During a write operation, the ECC applying apparatus stores data in the memory region and stores ECC code in the ECC memory according to an ECC address location. As an input address, an address to be stored through an address decoder is selected. The ECC applying apparatus uses a selective ECC application method of applying the ECC operation only to word lines N+1, N+3, . . . during a first write operation and applying the ECC operation only to word lines N, N+2, . . . during a write operation of the next frame.

When generating an ECC code, the ECC applying apparatus uses a selective ECC method in which the address decoder generates an ECC code for WL_0 and does not generate an ECC code for WL_1 based on the word lines (WL). This selective ECC application method may be selectively applied to all memory cells up to WL_N, so the ECC memory used in the entire memory cell region may be reduced by half.

The ECC applying apparatus applies the same method to the read operation, so that the address decoder regenerates the ECC code from the memory read at WL_0 based on the word lines (WL) and then compares the same with the read ECC code. Also, the ECC applying apparatus reads the memory directly in WL_1 without comparing ECC, that is, through a general read operation to which the ECC operation is not applied.

When the above operation is performed, the memory region due to the ECC code may be reduced by half. If the memory cells are divided into n groups of memory cell arrays, the memory region may be reduced by 1/n. In addition, the ECC applying apparatus may reduce the latency generated in decoding the encoded ECC code.

Here, the ECC code is used to detect and correct memory errors, and if the ECC code covers only half of the memory region, it may be determined that the error detection and correction effect is reduced by half.

Meanwhile, the memory used in the artificial neural network-based system semiconductors is updated every frame to perform new write and read operations. Therefore, the ECC applying apparatus may detect the occurrence of errors in all memories every two frames by applying ECC to a word line to which the ECC operation was not applied in the next frame.

FIG. 5 is a diagram illustrating a truth table of an address decoder used in an embodiment of the present disclosure.

When the ECC applying apparatus uses an n-bit address decoder, $2^n$ outputs may be used as word lines. For example, for a 3×8 address decoder, the truth table is as shown in FIG. 5.

In the truth table shown in FIG. 5, 0 and 1 are repeated based on C, which is the lowest bit of the least significant bit (LSB). Therefore, when the ECC operation is applied alternately based on word lines, the ECC applying apparatus may apply the ECC operation only to a word line in which the LSB bit is 0 in a first frame and may apply the ECC operation only to a word line in which the LSB is 1 in a second frame.

FIGS. 6A, 6B, 7A and 7B are diagrams illustrating selective ECC write and read operations in a method for applying ECC to a memory according to an embodiment of the present disclosure.

First, the ECC write and read operations shown in FIGS. 6A, 6B, 7A and 7B show an example of detecting errors in all memories every two frames. The ECC applying apparatus checks the LSB of address decoder input information through the address decoder for each odd and even frame and selectively applies the ECC operation to a memory cell array of odd or even word lines corresponding to the LSB based on the word lines.

Figure 6A:
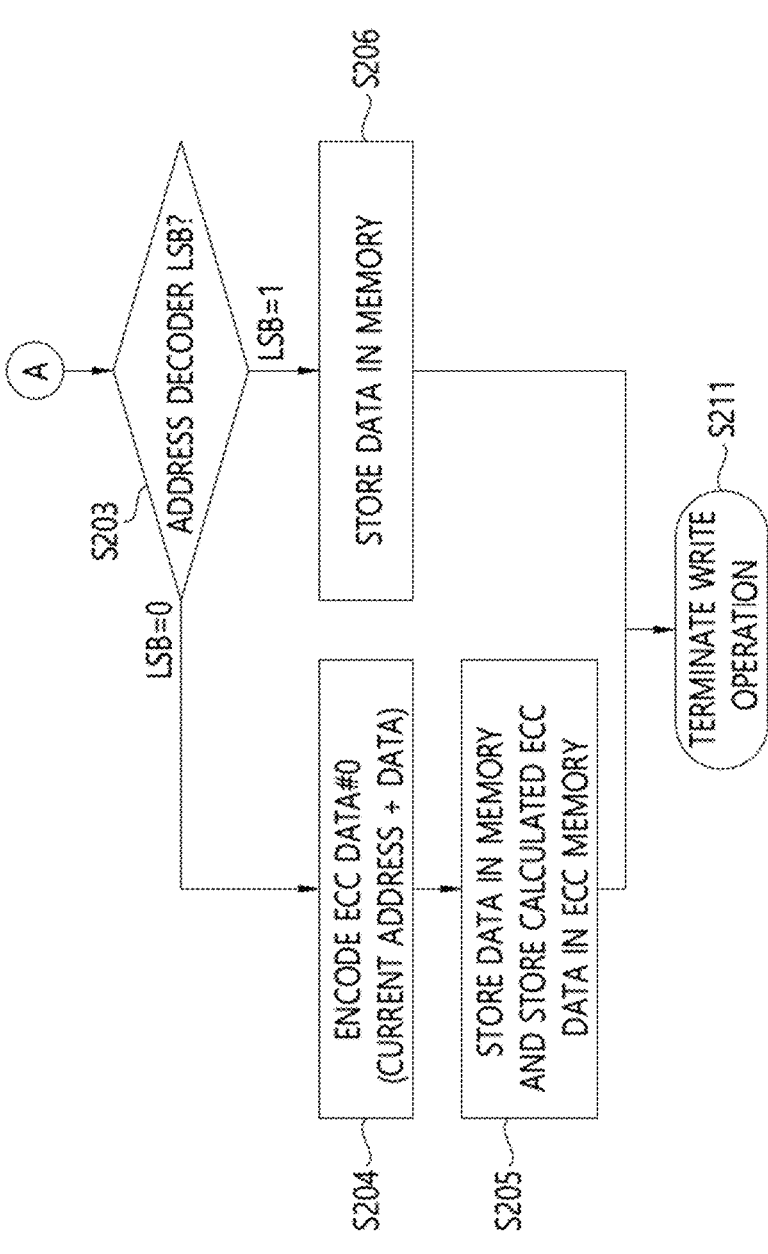
Figure 6B:
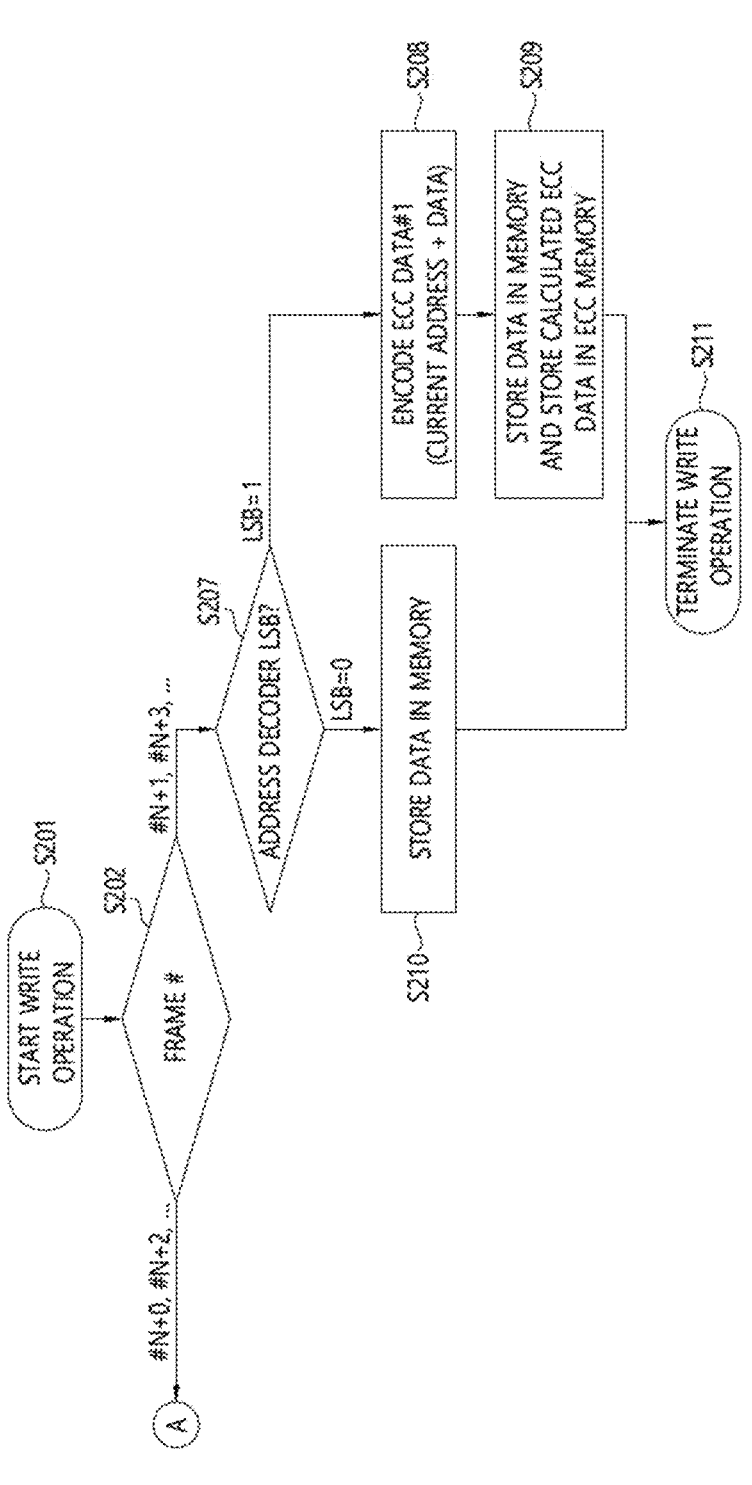

As shown in FIGS. 6A and 6B, in operation S201, the ECC applying apparatus starts a write operation of the memory.

In operation S202, the ECC applying apparatus checks a frame number #of data for the write operation.

In operation S203, when the frame numbers #are #N+0, #N+2, . . . , the ECC applying apparatus checks the LSB of address decoder input information through the address decoder.

In operation S204, if the LSB is 0 (LSB=0), the ECC applying apparatus encodes ECC data #0 using a current address and data.

In operation S205, the ECC applying apparatus stores data in the memory and stores the calculated ECC data in the ECC memory. In this manner, the ECC applying apparatus performs the ECC operation on the corresponding memory cell array when the LSB is 0 (LSB=0).

Meanwhile, in operation S206, the ECC applying apparatus stores data in the memory when the LSB is 1 (LSB=1). In this manner, when the LSB is 1 (LSB=1), the ECC applying apparatus does not perform an ECC operation on the corresponding memory cell array but perform a general write operation.

Meanwhile, in operation S207, when the frame numbers #are #N+1, #N+3, . . . , the ECC applying apparatus checks the LSB through the address decoder.

In operation S208, if the LSB is 1 (LSB=1), the ECC applying apparatus encodes ECC data #1 using the current address and data.

In operation S209, the ECC applying apparatus stores data in the memory and stores the calculated ECC data in the ECC memory. In this manner, the ECC applying apparatus performs the ECC operation on the corresponding memory cell array when the LSB is 1 (LSB=1).

Meanwhile, in operation S210, the ECC applying apparatus stores data in the memory when the LSB is 0 (LSB=0). In this manner, when the LSB is 0 (LSB=0), the ECC applying apparatus does not perform an ECC operation on the corresponding memory cell array but performs a general write operation.

Also, in operation S211, the ECC applying apparatus terminates the write operation for the memory cell after operations S205, S206, S209, and S210.

In this manner, in the case of a write operation, the ECC applying apparatus checks the frame number (frame #) information and then performs an ECC encoding operation on the word line in which the LSB of 0 in even frames and stores only data for the word line in which the LSB is 1.

Conversely, in the case of a write operation, the ECC applying apparatus may perform the ECC encoding operation on a word line in which the LSB is 1 in odd frames and store only data for the word line in which the LSB is 0.

Figure 7A:
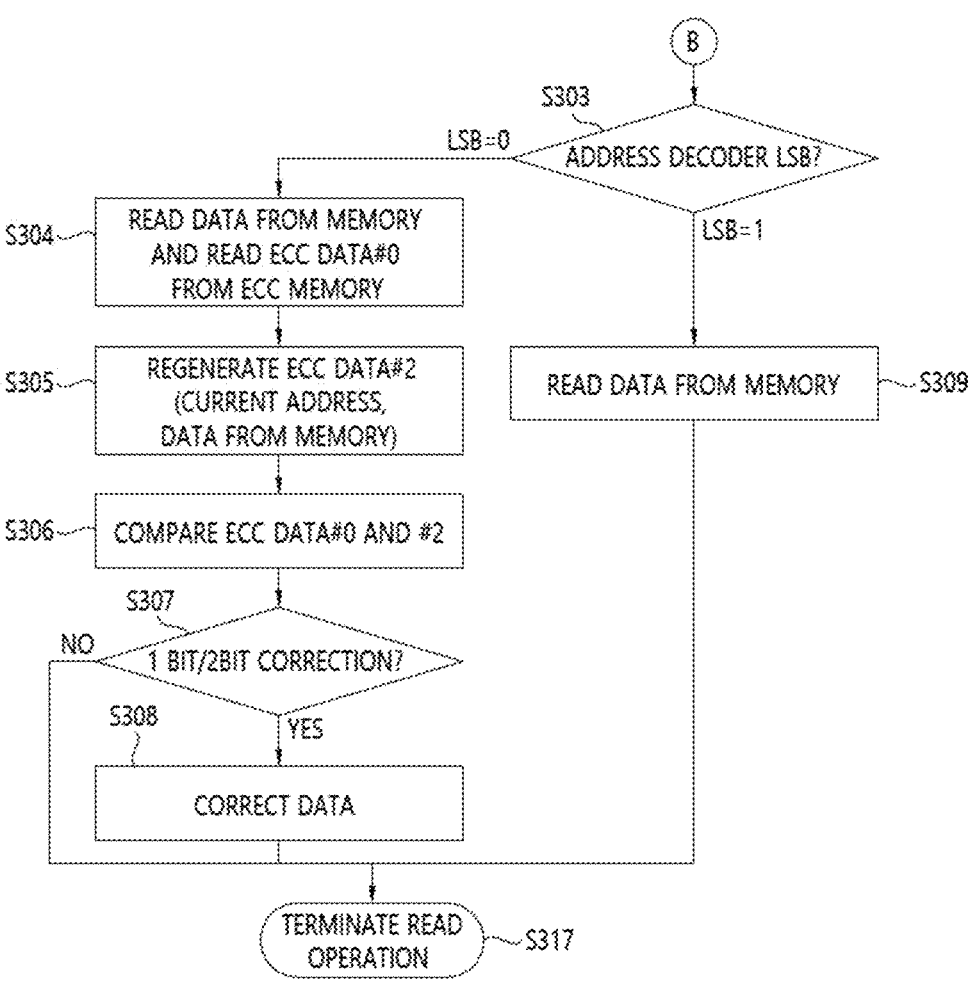

Meanwhile, as shown in FIGS. 7A and 7B, in operation S301, the ECC applying apparatus starts a read operation of the memory.

In operation S302, the ECC applying apparatus checks the frame number #of data for the read operation.

In operation S303, when frame numbers #are #N+0, #N+2, . . . , the ECC applying apparatus checks the LSB of address decoder input information through the address decoder.

In operation S304, if the LSB is 0 (LSB=0), the ECC applying apparatus reads data from the memory and reads ECC data #0 from the ECC memory.

In operation S305, the ECC applying apparatus regenerates ECC data #2 using the data read from the memory and the current address.

In operation S306, the ECC applying apparatus compares read ECC data #0 and regenerated ECC data #2.

In operation S307, the ECC applying apparatus checks whether the data read from the memory is not defective data or whether the data is defective data requiring 1-bit or 2-bit correction.

In operation S308, if 1-bit or 2-bit correction is required, the ECC applying apparatus performs a data correction operation on the corresponding bit.

Meanwhile, in operation S309, the ECC applying apparatus reads data from the memory when the LSB is 1 (LSB=1).

Meanwhile, in operation S310, when the frame numbers #are #N+1, #N+3, . . . , the ECC applying apparatus checks the LSB through the address decoder.

In operation S311, if the LSB is 1 (LSB=1), the ECC applying apparatus reads data from the memory and reads ECC data #1 from the ECC memory.

In operation S312, the ECC applying apparatus regenerates ECC data #3 using the data read from the memory and the current address.

In operation S313, the ECC applying apparatus compares the read ECC data #1 with the regenerated ECC data #3.

In operation S314, the ECC applying apparatus checks whether the data read from the memory is not defective data or is defective data requiring 1-bit or 2-bit correction.

In operation S315, if 1-bit or 2-bit correction is required, the ECC applying apparatus performs a data correction operation on the corresponding bit.

Meanwhile, in operation S316, the ECC applying apparatus reads data from the memory when the LSB is 0 (LSB=0).

Also, in operation S317, the ECC applying apparatus terminates the read operation for the memory cell after operations S308, S309, S315, and S316.

In this manner, in the case of a read operation, the ECC applying apparatus may check the frame number (frame #) information and then perform the ECC decoding operation on the word line in which the LSB is 0 in even frames and load only data on a word line in which the LSB is 1.

Conversely, in the case of a read operation, an ECC applying apparatus may perform an ECC decoding operation on a word line in which the LSB is 1 in odd frames and load only data on a word line in which the LSB is 0.

If selective ECC codes, such as those shown in FIGS. 6A, 6B, 7A and 7B, are applied, error detection and correction effects may be maintained for all memory cells within the vehicle-level FTTI. However, the error detection and correction effects may be reduced in a specific frame. Therefore, an embodiment of the present disclosure using a parity bit that may improve the error detection and correction effects reduced in a specific frame is described with reference to FIGS. 8A, 8B, 9A and 9B.

FIGS. 8A, 8B, 9A and 9B are diagrams illustrating selective ECC write and read operations using parity bits in a method for applying ECC to a memory according to an embodiment of the present disclosure.

Figure 8A:
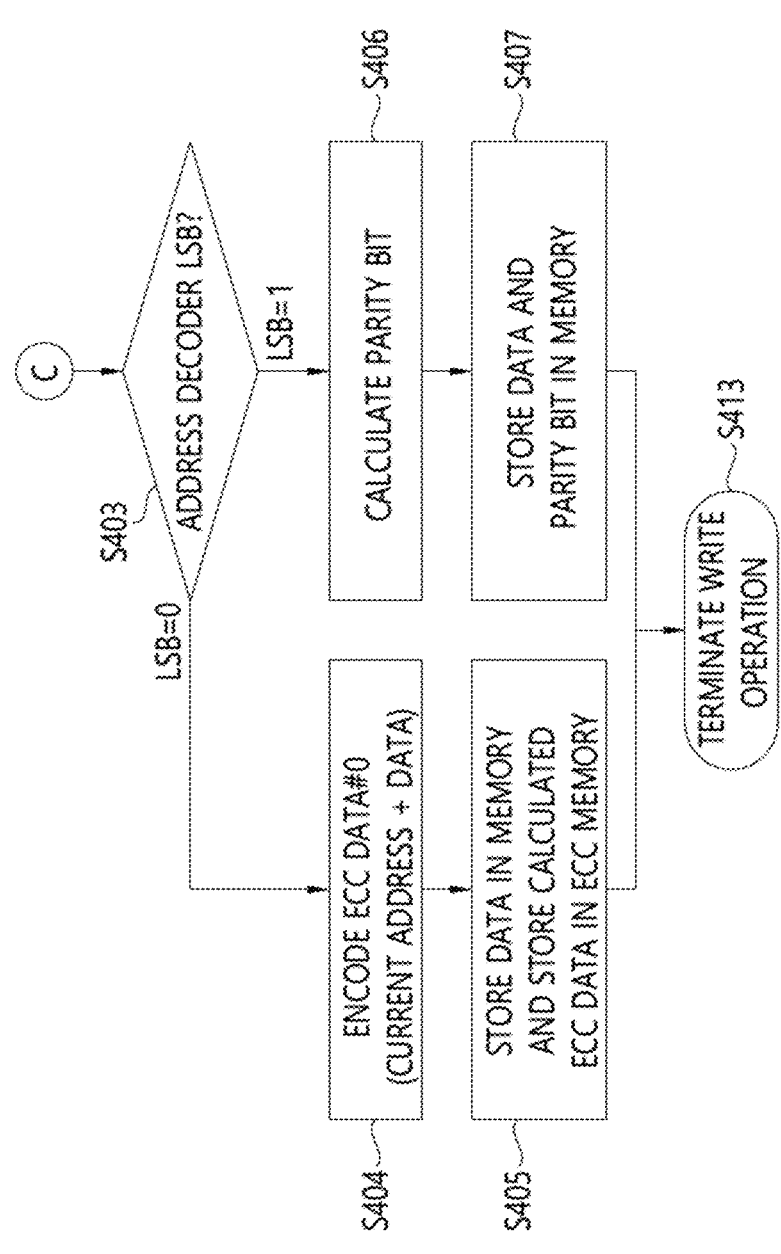
Figure 8B:
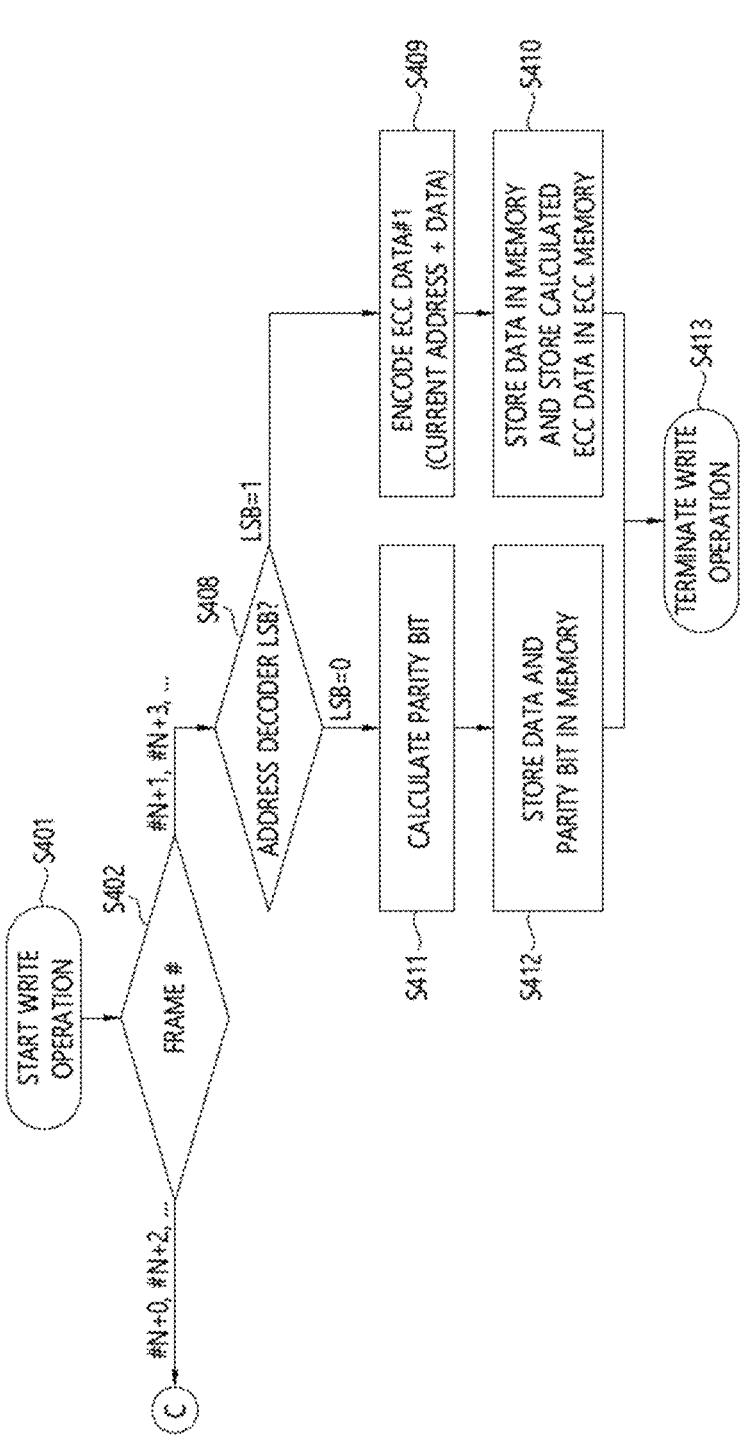

As shown in FIGS. 8A and 8B, in operation S401, the ECC applying apparatus starts a write operation of the memory.

In operation S402, the ECC applying apparatus checks the frame number #of data for a write operation.

In operation S403, when the frame numbers #are #N+0, #N+2, . . . , the ECC applying device checks the LSB of address decoder input information through the address decoder.

In operation S404, if the LSB is 0 (LSB=0), the ECC applying apparatus encodes ECC data #0 using the current address and data.

In operation S405, the ECC applying apparatus stores data in the memory and stores the calculated ECC data in the ECC memory. In this manner, the ECC applying apparatus performs the ECC operation on the corresponding memory cell array when the LSB is 0 (LSB=0).

Meanwhile, in operation S406, the ECC applying apparatus calculates a parity bit when the LSB is 1 (LSB=1).

In operation S407, the ECC applying apparatus stores the data and the calculated parity bit in the memory. In this manner, when the LSB is 1 (LSB=1), the ECC applying apparatus stores data and the parity bit without performing the ECC operation on the corresponding memory cell array.

Meanwhile, in operation $408, when the frame numbers #are #N+1, #N+3, . . . , the ECC applying apparatus checks the LSB through the address decoder.

In operation S409, if the LSB is 1 (LSB=1), the ECC applying apparatus encodes ECC data #1 using the current address and data.

In operation S410, the ECC applying apparatus stores data in the memory and stores the calculated ECC data in the ECC memory. In this manner, the ECC applying apparatus performs the ECC operation on the corresponding memory cell array when the LSB is 1 (LSB=1).

Meanwhile, in operation S411, the ECC applying apparatus calculates a parity bit when the LSB is 0 (LSB=0).

In operation S412, the ECC applying apparatus stores the data and the calculated parity bit in the memory. In this manner, when the LSB is 0 (LSB=0), the ECC applying apparatus stores the data and the parity bit without performing an ECC operation on the corresponding memory cell array.

Also, in operation S413, the ECC applying apparatus terminates the write operation for the memory cell.

Also, in operation S413, the ECC applying apparatus terminates the write operation for the memory cell after operations S405, S407, S410, and S412.

In this manner, the ECC applying apparatus uses the method of applying the ECC operation only to the word line with the LSB of 0 in the first frame and adding a parity bit to the word line with the LSB of 1. Accordingly, the error detection effect for word lines to which ECC operation is not applied may be improved. However, parity protection using parity bit detects errors in data cells but does not produce a correction effect. However, the ECC applying apparatus may minimize the memory region by adding only 1-bit check bit while improving the error correction effect as much as the ECC operation effect even for word lines that are not covered by the data cell of the first frame.

Figure 9A:
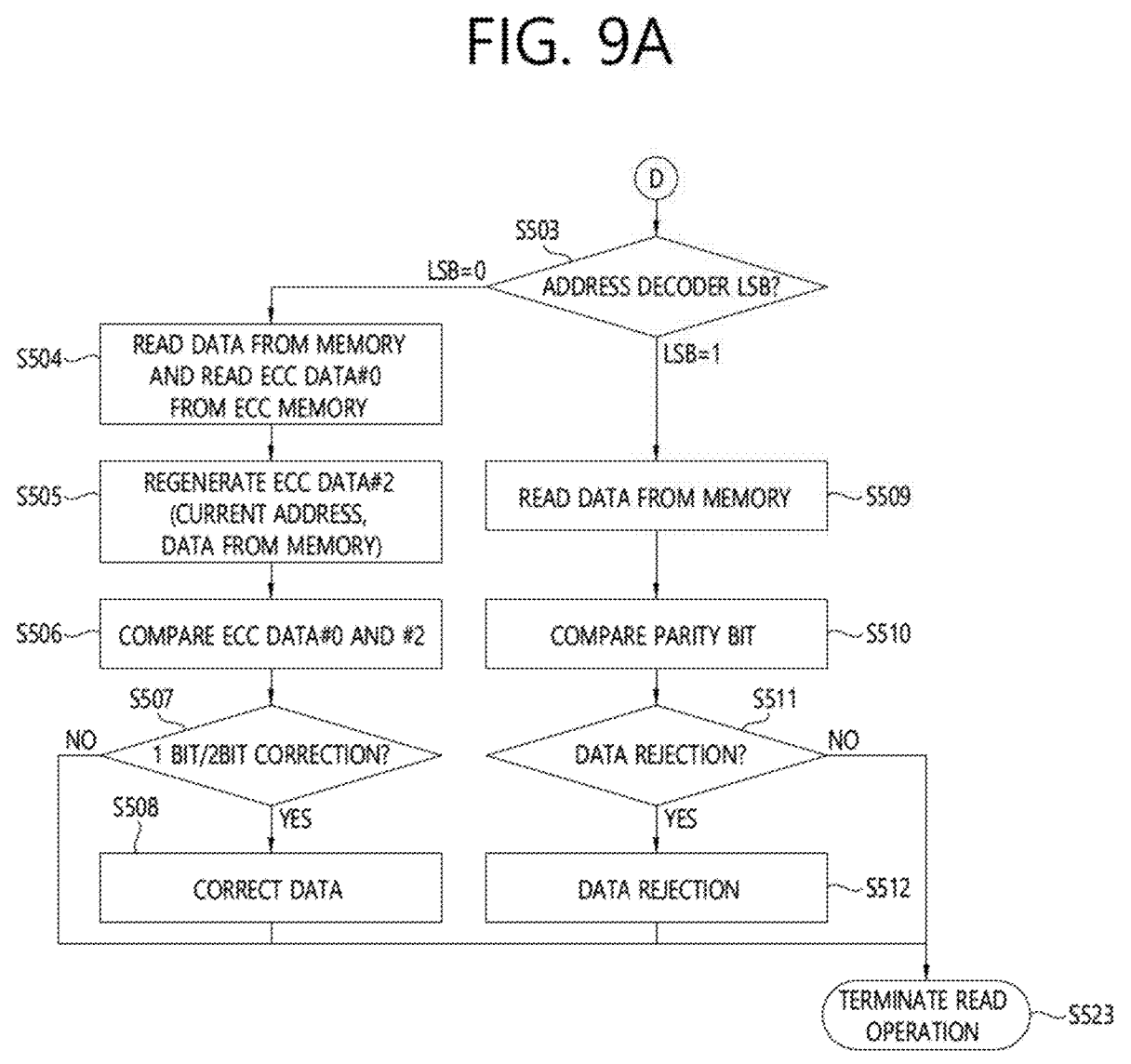
Figure 9B:
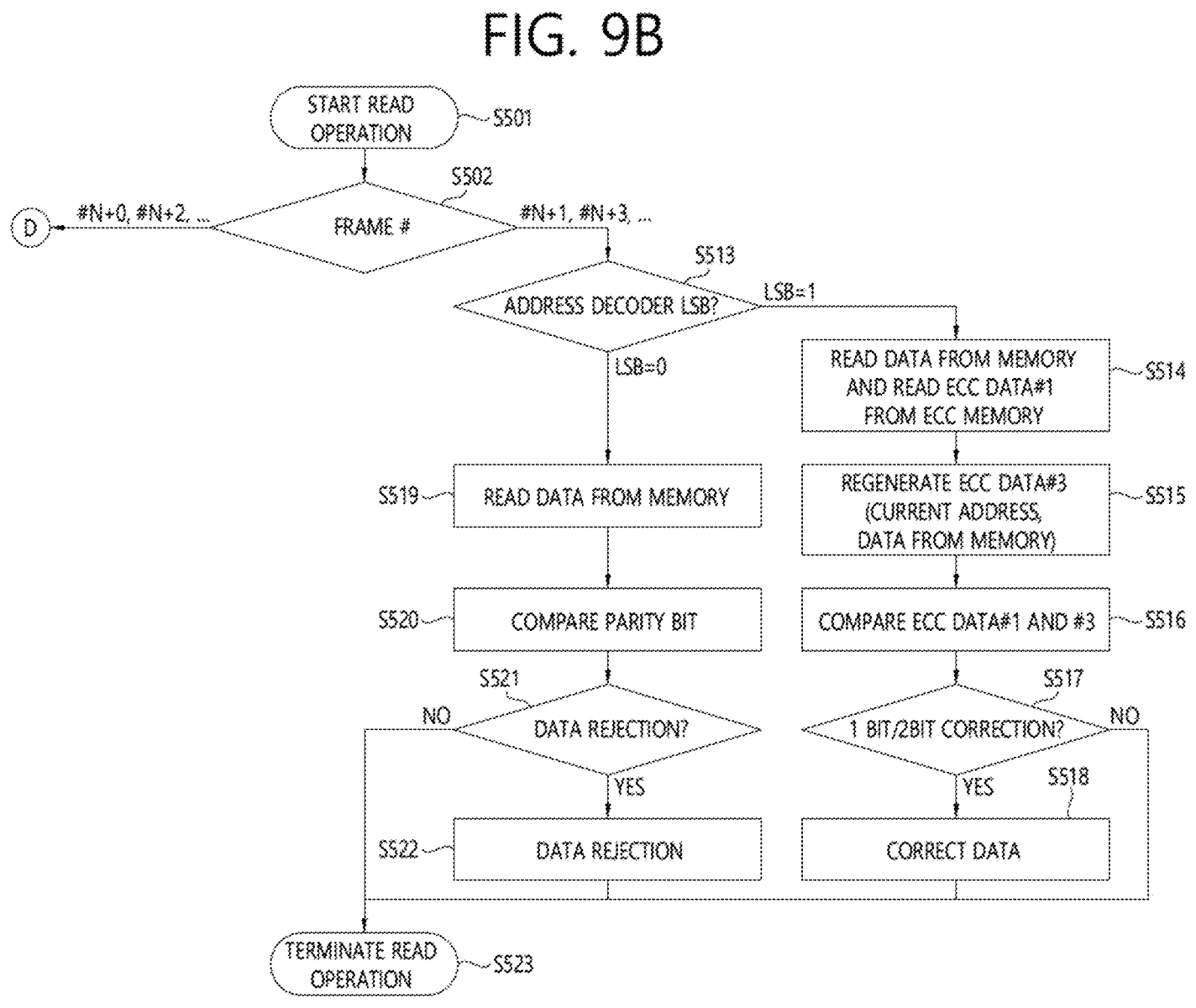

Meanwhile, as shown in FIGS. 9A and 9B, in operation S501, the ECC applying apparatus starts a read operation of the memory.

In operation S502, the ECC applying apparatus checks the frame number #of data for the read operation.

In operation S503, when frame numbers #are #N+0, #N+2, . . . , the ECC applying apparatus checks the LSB of the address decoder input information through the address decoder.

In operation S504, if the LSB is 0 (LSB=0), the ECC applying apparatus reads data from the memory and reads ECC data #0 from the ECC memory.

In operation S505, the ECC applying apparatus regenerates ECC data #2 using the data read from the memory and the current address.

In operation S506, the ECC applying apparatus compares the read ECC data #0 and the regenerated ECC data #2.

In operation S507, the ECC applying apparatus checks whether the data read from the memory is not defective data or is defective data requiring 1-bit or 2-bit correction.

In operation S508, if-bit or 2-bit correction is required, the ECC applying apparatus performs a data correction operation for the corresponding bit.

Meanwhile, in operation S509, the ECC applying apparatus reads data from the memory when the LSB is 1 (LSB=1).

In operation S510, the ECC applying apparatus compares the data read from the memory with a parity bit.

In operation S511, the ECC applying apparatus determines whether the data read from the memory is data rejection as a result of comparing the data with the parity bit.

In operation S512, the ECC applying apparatus rejects the data if the data read from the memory is data rejection. The ECC applying apparatus terminates the read operation if the data read from the memory is not data rejection.

Meanwhile, in operation S513, when the frame numbers #are #N+1, #N+3, . . . , the ECC applying apparatus checks the LSB through the address decoder.

In operation S514, if the LSB is 1 (LSB=1), the ECC applying apparatus reads data from the memory and reads ECC data #1 from the ECC memory.

In operation S515, the ECC applying apparatus regenerates ECC data #3 using the data read from the memory and the current address.

In operation S516, the ECC applying apparatus compares the read ECC data #1 and the regenerated ECC data #3.

In operation S517, the ECC applying apparatus checks whether the data read from the memory is not defective data or defective data requiring 1-bit or 2-bit correction.

In operation S518, if 1-bit or 2-bit correction is required, the ECC applying apparatus performs a data correction operation for the corresponding bit.

Meanwhile, in operation S519, the ECC applying apparatus reads data from the memory when the LSB is 0 (LSB=0).

In operation S520, the ECC applying apparatus compares the data read from the memory with a parity bit.

In operation S521, the ECC applying apparatus determines whether the data read from the memory is data rejection as a result of comparing the data with the parity bit.

In operation S522, the ECC applying apparatus rejects the data if the data read from the memory is data rejection. The ECC applying apparatus terminates the read operation if the data read from the memory is not data rejection.

Also, in operation S523, the ECC applying apparatus terminates the read operation for the memory cell after operations S508, S512, S518, and S522.

In this manner, the ECC applying apparatus checks the frame number information during the read operation and then performs the ECC decoding operation on the word line in which the LSB is 0 in even frames. In addition, the ECC applying apparatus may perform an operation to check for data errors by calculating the number of bits by combining the data and the parity bit for the word line in which the LSB is 1.

Figure 10:
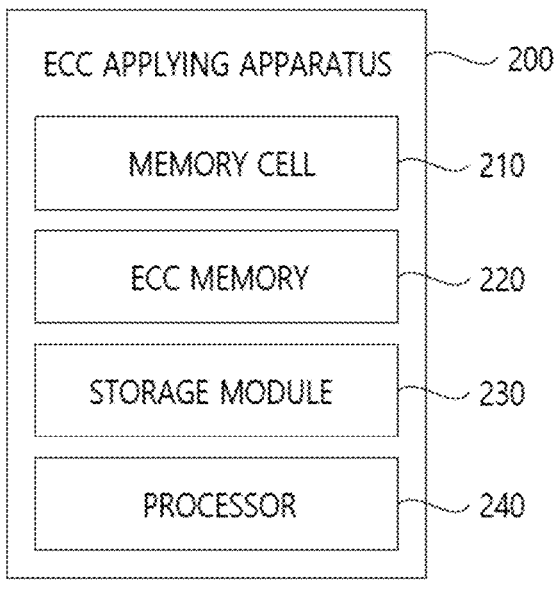
FIG. 10 is a configuration diagram of an apparatus for applying ECC to a memory in an artificial neural network-based system semiconductor according to an embodiment of the present disclosure.

FIG. 10 is a configuration diagram of an apparatus for applying ECC to a memory in an artificial neural network-based system semiconductor according to an embodiment of the present disclosure.

As shown in FIG. 10, an ECC applying apparatus 200 for a memory according to an embodiment of the present disclosure includes a memory cell 210, an ECC memory 220, a storage module 230, and a processor 240. However, not all of the illustrated components are essential components. The ECC applying apparatus 200 may be implemented with more components than the illustrated components, or the ECC applying apparatus 200 may be implemented with fewer components.

Hereinafter, a specific configuration and operation of each component of the ECC applying apparatus 200 of FIG. 10 are described.

The memory cell 210 stores data generated by an artificial neural network-based system semiconductor.

The ECC memory 220 stores ECC codes related to ECC write or read operations.

The storage module 230 stores one or more programs related to a method for applying ECC to a memory in an artificial neural network-based system semiconductor.

The processor 240 executes one or more programs stored in the storage module 230. The processor 240 divides the memory cells into a plurality groups (first to m-th frames) of memory cell arrays corresponding to first to n-th frames based on word lines. Hereinafter, n and m are natural numbers greater than or equal to 2, performs an ECC write or read operation by applying error correction code (ECC) to the memory cell array of the group corresponding to each frame of the first to n-th frames, and performs a general write or read operation without applying ECC to the memory cell array of the remaining groups excluding the group corresponding to each frame.

According to embodiments, the number of ECC applications that may be applied to the ECC write or read operation and the general write or read operation may be adjusted depending on the FTTI time and frame processing time.

According to embodiments, in an ECC write operation, ECC code is generated by the ECC encoder based on write data in the memory cell array of the group corresponding to each frame selected by the address decoder based on the word lines, and the write data may be stored in the memory and the generated ECC code may be stored in the ECC memory.

According to embodiments, in an ECC read operation, ECC code is regenerated from the memory cell array of the group corresponding to each frame selected by the address decoder based on the word lines, and the regenerated ECC code may be compared with the ECC code read from the ECC memory.

According to embodiments, the processor 240 may apply ECC to the memory cell array of the group corresponding to each frame selected based on the LSB of the address decoder input information.

According to embodiments, the processor 240 may perform a write or read operation by adding a parity bit for error detection to the memory cell array of the remaining groups excluding the group corresponding to each of the first to n-th frames.

According to embodiments, the processor 240 may detect an error by calculating the number of bits by combining the read data and the parity bit of the selected word line based on the LSB of the address decoder input information in the memory cell array of the remaining groups excluding the group corresponding to each frame.

In this manner, the ECC applying apparatus 200 according to an embodiment of the present disclosure may reduce an additional memory region generated when using the ECC operation by considering the memory usage method used in the artificial neural network-based system semiconductor.

The ECC applying apparatus 200 according to an embodiment of the present disclosure may reduce an additional memory region generated when applying the ECC operation by half by selectively applying the ECC operation based on the word lines of the memory. In addition, considering an application that updates the memory every frame, the ECC applying apparatus 200 may detect a failure in all memory regions within the frames (e.g., 2 frames, 3 frames, etc.) within the FTTI.

The ECC applying apparatus 200 according to an embodiment of the present disclosure may further reduce the memory region that is reduced when considering the frame processing time interval of the artificial neural network that may be processed within the vehicle-level FTTI.

The ECC applying apparatus 200 according to an embodiment of the present disclosure may reduce memory latency by reducing a decoding task that occurs after ECC encoding by half.

According to an example embodiment of the disclosure, the various example embodiments described above may be implemented by software including instructions that are stored in a machine (e.g. a computer) readable storage medium. The machine, which is a device capable of calling an instruction stored in the storage medium and operating according to the called instruction, may include an electronic device (e.g. an electronic device A) according to the embodiments described above. In an example in which an instruction is executed by a processor, a function corresponding to the instruction may be performed directly by the processor or using other components under the control of the processor. The instruction may include a code generated by a compiler or a code executable by an interpreter. The machine-readable storage medium may be provided in the form of a non-transitory storage medium. The 'non-transitory' storage medium is tangible, and it does not limit the storage medium to mean that data is stored semi-permanently or temporarily thereon.

According to an embodiment of the disclosure, the method according to the various embodiments described above may be included and provided in a computer program product. The computer program product may be traded as a product between a seller and a buyer. The computer program product may be distributed in the form of a machine-readable storage medium (e.g. a compact disc read only memory (CD-ROM)) or online via an application store (e.g. Play Store™). In case of on-line distribution, at least a part of the computer program product may be at least temporarily stored in a storage medium, such as a memory of a server of a manufacturer, a server of an application store, or a relay server, or be temporarily generated.

Meanwhile, various embodiments described above may be implemented in a computer or similar device-readable recording medium using software, hardware, or a combination thereof. In the case of software implementation, embodiments, such as procedures and functions described in this disclosure may be implemented as separate software modules. Each of the software modules may perform one or more functions and operations described in this disclosure.

Meanwhile, computer instructions for performing the processing operations according to various embodiments of the present disclosure described above may be stored in a non-transitory computer-readable medium. The computer instructions stored on such a non-volatile computer-readable medium may cause a particular device to perform processing operations according to various embodiments described above when executed by a processor. A non-transitory readable medium is not a medium for storing data for a short time, such as a register, cache or memory, but refers to a medium that semi-permanently stores data and may be read by a device. Specifically, the non-transitory readable medium may include a CD, DVD, hard disk, Blu-ray disc, USB, memory card, or ROM.

Further, each of the components (e.g. module or program) according to the various embodiments described above may be comprised of a single entity or a plurality of entities, and some of the sub-components described above may be omitted or another sub-component may be in addition included to various embodiments. Generally or in addition, some of the components (e.g., module or program) may be integrated into one entity, and may perform functions performed by the respective corresponding components before being integrated in the same or similar manner. Operations performed by a module, a program, or other components according to various embodiments may be executed sequentially, in parallel, repeatedly, or in a heuristic manner. In addition, at least some operations may be executed in different sequences or may be omitted. Alternatively, other operations may be added.

While the disclosure has been described with reference to the embodiments, the disclosure is not limited to the above-described specific embodiments, and it will be understood by those skilled in the related art that various modifications and variations may be made without departing from the scope of the disclosure as defined by the appended claims, as well as these modifications and variations should not be understood separately from the technical spirit and prospect of the disclosure.

What is claimed is:

1. A method for applying an error correction code (ECC) to a memory in an artificial neural network-based system semiconductor, the method comprising:
dividing memory cells into a plurality of groups of memory cell arrays corresponding to first to n-th frames based on word lines, wherein n is a natural number greater than or equal to 2;
performing an ECC write or read operation by applying the ECC to a memory cell array of a group corresponding to each of the first to n-th frames; and
performing a general write or read operation without applying the ECC to the memory cell array of the remaining groups excluding the group corresponding to each of the first to n-th frames,
wherein a number of the ECC write or read operation by applying the ECC and the general write or read operation is adjusted according to fault handing time interval (FTTI) time and a frame processing time.

2. The method of claim 1, wherein, in the ECC write operation, the ECC is generated by an ECC encoder based on write data in the memory cell array of the group corresponding to each frame selected by an address decoder based on the word lines, and the write data is stored in the memory and the generated ECC is stored in an ECC memory.

3. The method of claim 1, wherein, in the ECC read operation, the ECC is regenerated from the memory cell array of the group corresponding to each frame selected by an address decoder based on the word lines, and the regenerated ECC is compared with the ECC read from an ECC memory.

4. The method of claim 1, wherein, in the performing of the ECC write or read operation, the ECC is applied to the memory cell array of the group corresponding to each frame selected based on a least significant bit (LSB) of address decoder input information.

5. The method of claim 1, wherein, in the performing of the general write or read operation, a write or read operation is performed by adding a parity bit for error detection to the memory cell array of the remaining groups excluding the group corresponding to each of the first to n-th frames.

6. The method of claim 1, wherein, in the performing of the general write or read operation, an error is detected by calculating the number of bits by combining read data and a parity bit of a selected word line based on an LSB of address decoder input information in the memory cell array of the remaining groups excluding the group corresponding to each frame.

7. An apparatus for applying an error correction code (ECC) to a memory in an artificial neural network-based system semiconductor, the apparatus comprising:

a memory cell configured to store data generated by the artificial neural network-based system semiconductor;

an ECC memory configured to store the ECC related to an ECC write or read operation;

a storage module configured to store one or more programs; and a processor configured to execute the one or more stored programs, wherein the processor is configured to:

divide memory cells into a plurality of groups of memory cell arrays corresponding to first to n-th frames based on word lines, wherein n is a natural number greater than or equal to 2, perform the ECC write or read operation by applying the ECC to a memory cell array of a group corresponding to each of the first to n-th frames, and perform a general write or read operation without applying the ECC to the memory cell array of the remaining groups excluding the group corresponding to each of the first to n-th frames, wherein a number of ECC applications applicable to the ECC write or read operation and the general write or read operation is adjusted according to fault handing time interval (FTTI) time and frame processing time.

8. The apparatus of claim 7, wherein, in the ECC write operation, the ECC is generated by an ECC encoder based on write data in the memory cell array of the group corresponding to each frame selected by an address decoder based on the word lines, and the write data is stored in the memory and the generated ECC is stored in the ECC memory.

9. The apparatus of claim 7, wherein, in the ECC read operation, the ECC is regenerated from the memory cell array of the group corresponding to each frame selected by an address decoder based on the word lines, and the regenerated ECC is compared with the ECC read from the ECC memory.

10. The apparatus of claim 7, wherein the processor is configured to apply the ECC to the memory cell array of the group corresponding to each frame selected based on a least significant bit (LSB) of address decoder input information.

11. The apparatus of claim 7, wherein the processor performs a write or read operation by adding a parity bit for error detection to the memory cell array of the remaining groups excluding the group corresponding to each of the first to n-th frames.

12. The apparatus of claim 7, wherein the processor is configured to detect an error by calculating the number of bits by combining read data and a parity bit of a selected word line based on an LSB of address decoder input information in the memory cell array of the remaining groups excluding the group corresponding to each frame.

* * * * *